United States Patent Office 3,789,032
Patented Jan. 29, 1974

3,789,032
POLYURETHANE-POLYUREA ELASTOMERS BASED ON HIGH TRANS-TRANS, 4,4′-METHYLENEBIS-(CYCLOHEXYL ISOCYANATE)
Guenther Kurt Hoeschele, Wilmington, Del., assignor to E. I. du Pont de Nemours and Company, Wilmington, Del.
No Drawing. Filed June 22, 1971, Ser. No. 155,630
Int. Cl. C08g 22/24
U.S. Cl. 260—75 NT                13 Claims

ABSTRACT OF THE DISCLOSURE

Polyurethane/polyureas prepared by the process of reacting 4,4′-methylenebis(cyclohexyl isocyanate) containing at least 60% of the trans-trans isomer with a polyol and a polyamine in proportions such that there is an excess of isocyanato groups over hydroxy and amino groups and sufficient water is provided to react with the excess isocyanato groups. The polyurethane/polyureas, which have outstanding abrasion resistance, creep resistance, and compression set, are particularly useful in making cast elastomeric articles.

BACKGROUND OF THE INVENTION

Polyurethanes obtained by curing isocyanto-terminated prepolymers with diamines are finding increased use in diverse applications requiring castable elastomers. These polyurethanes are usually based on aromatic polyisocyanates such as tolylene diisocyanates or 4,4′-methylene-bis(phenyl isocyanate). Recently, however, aliphatic polyisocyanates have become more important in the polyurethane industry because of the improved color and hydrolytic stability of polyurethanes formed from them; see, for example, U.S. 3,456,037 to Hoeschele.

Of the aliphatic polyisocyanates, 4,4′-methylene-bis (cyclohexyl isocyanate ) (PICM), lysine methylester diisocyanate, isophorone diisocyanate, and 2,2,4-trimethyl hexamethylene diisocyanate are attracting increased attention largely because of their low volatility and availability. Elastomers made from these isocyanates, however, have not generally had satisfactory physical properties, especially compression set and abrasion resistance. Moreover, attempts to improve the compression set of such elastomers by conventional means such as curing with a curing agent of higher functionality, e.g., a triamine, have not been successful. At low triamine levels the compression set is not improved, while at very high triamine levels other properties are adversely affected.

SUMMARY OF THE INVENTION

This invention provides a polyurethane/polyurea elastomer prepared by the process of reacting a 4,4′-methylene-bis(cyclohexyl isocyanate) containing at least about 60% of the trans-trans isomer of 4,4-methylene-bis(cyclohexyl isocyanate) with a polyol, an aromatic polyamine, and water, said diisocyanate, polyol, and polyamine being used in proportions such that (a) there are about 1.4–4.0 equivalents of diisocyanate per equivalent of polyol, (b) polyamine is provided in an amount of about 65–98% of the excess isocyanato groups over the hydroxy groups, and (c) sufficient water is provided to react with the excess equivalents of isocyanato groups over the equivalents of hydroxyl plus amino groups.

DETAILED DESCRIPTION

The diisocyanate used in preparing the polyurethane/polyureas of this invention is 4,4′-methylene-bis(cyclohexyl isocyanate) (PICM). Ordinarily, PICM compositions contain three stereoisomers, the trans-trans, cis-cis, and cis-trans; and the PICM used in this invention should contain at least about 60% of the trans-trans isomer. The PICM's containing about 70–85% trans-trans isomer are especially preferred since they yield polyurethanes having particularly good physical properties and they can be conveniently prepared from readily available materials.

The PICM used in this invention is prepared by phosgenating the corresponding 4,4′-methylene-bis(cyclohexyl amine) (PACM) by procedures well known in the art, cf. U.S. Pats. 2,644,007, 2,680,127, and 2,908,703. The PACM isomer mixtures which upon phosgenation yield the PICM useful in this invention are also well known in the art and can be obtained by hydrogenation of methylenedianiline under mild conditions and/or by fractional crystallization of PACM isomer mixtures in the presence of water and alcohols, see U.S. 3,153,088 to Arthur.

The polyether and polyester polyols normally used in the preparation of polyurethane elastomers can be employed in preparing the compositions of this invention. These polyols are preferably diols, but minor amounts of higher functionality polyols may be used in admixture with diols. Representative polyols are polyalkyleneether glycols such as polyethyleneether glycol, polypropyleneether glycol, nad polytetramethyleneether glycol and the polyethers prepared by the copolymerization of cyclic ethers such as ethylene oxide, propylene oxide, trimethylene oxide, and tetrahydrofuran with aliphatic polyols such as ethylene glycol, 1,3-butanediol, diethylene glycol, dipropylene glycol, 1,2-propylene glycol, and 1,3-propylene glycol; polyester glycols prepared by the polymerization of cyclic lactones such as ε-caprolactone or by the condensation polymerization of a dicarboxylic acid or its condensation equivalent and a molar excess of an organic polyol, representative diacids being succinic, glutaric and adipic acids and representative organic polyols being ethylene glycol, propylene glycol, 1,3-butanediol, 1,4-butanediol, 1,6-hexanediol, neopentyl glycol, and mixtures thereof. Polyurethanes based on polyesters have improved tear strength, but reduced hydrolytic stability because of the tendency of the polyesters to hydrolyze in the presence of water. The preferred polyols have molecular weights of about 600–2000; polyalkyleneether polyols in this molecular weight range are especially preferred. A particularly effective polyol is polytetramethyleneether glycol having a molecular weight of about 1000.

It is also possible to employ as part of the polyol component an aliphatic polyol having a low molecular weight (below about 350) such as ethylene glycol, 1,3-butanediol, 1,4-butanediol, and diethylene glycol. Such low molecular weight glycols are normally used in amounts up to about 50% by weight of the total polyol used. Minor amounts of polyfunctional polyols such as trimethylolpropane and glycerol can also be used in about the same proportions.

The polyol component is used in an amount such that there are about 1.4–4.0 equivalents of diisocyanate per equivalent of polyol in the formulation.

The amine curing agents used in this invention are aromatic polyamines. Diamines are preferred, but can be used with minor amounts of polyamines having higher functionality. The aromatic portion of the amines can be a single ring system as in benzene or a condensed ring system as in naphthalene and phenanthrene. Aromatic diamines free of negative substituents such as chloro, bromo, nitro, carbomethoxy, and trifluoromethyl groups, are preferred; representative examples being 4,4'-methylenedianiline, the phenylene diamines, the tolylene diamines, cumene diamines, naphthalene diamines, benzidine, 3,3'-dimethylbenzidine, 4,4'-methylenebis(2-methylaniline), and 4,4'-methylenebis(2-methoxyaniline). Polyamines having negative substituents can also be used although they react more slowly with PICM prepolymers and do not give such good results as do the preferred amines. Representative of the negatively substituted aromatic polyamines are 4,4'-methylenebis(2-chloroaniline), 4,4'-methylenebis(2 - trifluoromethylaniline), 3,3'-dichlorobenzidine, 4,4' - methylenebis(2 - carbomethoxyaniline), or the crude polyamine composition prepared by condensing from about 1.3–2.0 moles of a mixture of aniline and 2-chloroaniline with formaldehyde in the presence of a mineral acid as described in U.S. Pat. 3,567,906 as Hoeschele. The polyamines are used in an amount sufficient to react with about 65–98% and preferably about 80–95% of the excess isocyanato groups provided by the PICM over the hydroxyl groups provided by the polyol.

The polyurethane/polyureas of this invention are usually prepared by mixing the PICM, polyol, and polyamine and contacting the resulting product with sufficient water to react with the excess isocyanato groups present. Although the PICM, polyol, and polyamine, and even the water can be mixed simultaneously, as in a one-shot process, the much preferred method is to prepare an isocyanato-terminated prepolymer by first reacting the PICM and polyol followed by reaction (curing or chain extension) of the resulting prepolymer with the polyamine. The amine cure is usually effected by heating at about 80–150° C. for about one hour to two days. Elastomers prepared by the prepolymer procedure have significantly superior properties over "one-shot" elastomers. Actual mixing of the components can be accomplished continuously or stepwise. Cast objects are made by pouring the elastomer-forming ingredients (usually a mixture of the prepolymer and polyamine) into a mold and heating to effect the amine cure.

Unless all the ingredients are mixed substantially simultaneously as in the "one-shot" process, the final step in preparing the elastomers of this invention is to contact the PICM-polyol-amine formulation with sufficient water to complete the cured product. In the prepolymer processes, the water can be added to the prepolymer with the amine or it can be provided after the amine has reacted with the prepolymer. The preferred method of water-curing is to post-cure a molded PICM-polyol-amine reaction product in a water-vapor containing atmosphere. The time required for post-curing is a function of the water content of the environment and/or the temperature. The time required for post-cure can also be varied by employing catalysts which promote the water-isocyanate reaction. At 100% relative humidity and room temperature, post-cure is effected in about 4–5 days without the use of any catalyst. At 50° C. and 100% relative humidity, the post-cure requires about one day. Post-cure with steam takes about an hour. If desired, the amine and water cures can be carried out simultaneously in a steam oven at about 100–150° C.

When catalysts are employed, the above periods required for post-cure are significantly reduced. The preferred method for post-curing the molded amine-cured elastomer in the presence of a catalyst is to store the elastomer at room temperature in an atmosphere having a relative humidity of at least about 30% for about one week. Representative catalysts for the water-isocyanate reaction are organotin compounds such as dibutyltin dilaurate; tin salts such as stannous octoate and stannic chloride; lead salts such as lead naphthenate; tertiary amines such as triethylenediamine and N,N,N',N'-tetramethylbutane diamine; guanidines such as tetramethyl guanidine, 2-decyl- or 2-dodecyl-tetramethylguanidine; and amidines such as 1,5-diazabicyclo[4.3.0]nonene-5 and N'-n-decyl - N,N - dimethylformamidine. Organotin compounds and tertiary amines are preferred. These catalysts, which are used in amounts of about 0.001–0.5% by weight based on the combined weight of PICM, polyol, and amine, can be mixed at any time prior to gelation with the elastomer-forming ingredients. They have little or no effect on the rate of the isocyanate/amine reaction. The catalysts are preferably added to the system in admixture with the amine component.

Further information regarding techniques of mixing, casting, and curing the elastomer-forming ingredients of this invention can be found in Columns 7 and 8 of U.S. 3,456,037 to Hoeschele.

At any time during the preparation of the elastomers of this invention, various additives as needed to impart specific properties, e.g., fillers, stabilizers, plasticizers, pigments, etc., can be incorporated by procedures well known in the art.

The polyurethane/ureas of this invention are particularly useful as cast elastomers for various applications. Because of their hydrolytic stability, they are especially useful in applications where the elastomer is exposed to moisture at elevated temperatures. The elastomers of this invention also have excellent resistance to abrasion, creep, and compression set. Thus, they are well suited for use as gaskets, coatings for pneumatic conveyors and chutes, conveyor-belts, and in potting and encapsulation applications.

The invention is further illustrated by the following examples wherein all parts, proportions, and percentages are by weight unless otherwise indicated.

The following ASTM methods are employed in determining the properties of the elastomers prepared in the examples.

Tensile strength _____ D–412
Elongation at break _____ D–412
Modulus, 100% _____ D–412
Modulus, 300% _____ D–412
Tear strength _____ D–470
Trouser tear _____ *D–470
Compression set _____ D–395
Bashore resilience _____ D–1054
Hardness, Durometer A _____ D–676
Hardness, Durometer D _____ D–1484

*Modified by use of 1.5" x 3" sample with 1.5" cut on the long axis of the sample. This configuration prevents "necking down" at the point of tearing.

Example 1(a)

A prepolymer is prepared by heating a mixture of 980 parts of polytetramethylene ether glycol (number average molecular weight about 980) and 524 parts of 4,4'-methylenebis(cyclohexyl isocyanate) (PICM) containing 70% trans-trans isomer for 2 hours at 120° C. The prepolymer is then cooled to room temperature and stored in dry containers until required. The prepolymer has an NCO content of 5.39% by ASTM D–1638.

To 70 parts of the above prepolymer heated to 90° C. and contained in a vessel equipped with a high-speed agitator is added 8.46 parts of molten methylenedianiline and 0.07 part of dibutyltin dilaurate. The mixture is agitated for about 45 seconds and poured into molds to prepare slabs for physical testing. The amount of methyleneaniline used is equivalent to 95% of the isocyanato groups contained in the prepolymer. The molded elastomer is cured for 6 hours at 100° C. and tested after 7 days at 25° C./50% relative humidity.

For comparison, a control elastomer is prepared by substantially the same procedure except that PICM containing about 50% trans-trans isomer is used in place of the 70% trans-trans PICM. Physical properties for both elastomers are tabulated below:

|  | Elastomer from 70% trans-trans | Control from 50% trans-trans |
|---|---|---|
| Tensile strength, p.s.i. | 6,800 | 6,000 |
| Elongation at break, percent | 440 | 320 |
| Modulus: | | |
| 100%, p.s.i. | 1,680 | 1,660 |
| 300%, p.s.i. | 3,600 | 4,580 |
| Tear, D 470, p.l.i. | 116 | 71 |
| Trouser tear, p.l.i. (50 in./min.) | 250 | 156 |
| Compression set, jB, percent (22 hrs. at 70° C.) | 36 | 54 |
| Bashore resilience, percent | 50 | 51 |
| Hardness, Durometer D | 52 | 50 |

The elastomer of this invention exhibits substantial improvements in compression set and tear strength relative to the control.

Substantially identical results are obtained when the 0.07 part of dibutyltin dilaurate catalyst is replaced with 0.018 part of either N,N,N'N'-tetramethyl-1,3-butane diamine or triethylene diamine.

If the elastomer prepared from the 70% trans-trans PICM is stored for 7 days at 25° C. in the absence of water vapor rather than at 50% relative humidity, the compression set is increased from 36 to 51%, illustrating the importance of the water-curing step.

(b) Two elastomer samples are prepared by the procedure of this example with the exception that an equimolar amount of lysine methylester diisocyanate is used in place of PICM containing 70% trans-trans isomer in one sample and an equimolar amount of isophorone diisocyanate is used in place of the PICM in the other. Both of these elastomers have compression sets of about 58%.

Example 2

A prepolymer is prepared by reacting 980 parts of polytetramethylene ether glycol (number average molecular weight about 980) with 524 parts of PICM containing 60% trans-trans isomer for 2 hours at 120° C. An elastomer is prepared from 100 parts of the prepolymer, 7.7 parts of molten 2,4-tolylene diamine and 0.01 part of dibutyltin dilaurate by the procedure of Example 1. The amount of diamine is equivalent to 95% of the isocyanate groups in the prepolymer. The molded elastomer is cured for 6 hours at 100° C. and tested after 7 days at 25° C./50% relative humidity.

For comparison, a control elastomer is prepared substantially by the foregoing procedure with the exception that PICM containing 20% trans-trans isomer is used in place of the 60% trans-trans PICM. Properties of both elastomers are tabulated below.

|  | Elastomer from 60% trans-trans | Control from 20% trans-trans |
|---|---|---|
| Tensile strength, p.s.i. | 3,800 | 5,700 |
| Elongation at break, percent | 340 | 330 |
| Modulus: | | |
| 100%, p.s.i. | 1,670 | 1,450 |
| 300%, p.s.i. | 3,410 | 5,000 |
| Tear, D 470, p.l.i. | 85 | 83 |
| Compression set B, percent (22 hrs. at 70° C.) | 36 | 50 |
| Bashore resilience, percent | 50 | 43 |
| Hardness, Durometer D | 52 | 53 |

The compression set of the elastomer of this invention is substantially better than that of the control.

Example 3

A series of 4 elastomers is prepared by the procedure of Example 1 by mixing 100 part portions of the 70% trans-trans PICM prepolymer prepared in Example 1 with increasing amounts of methylenedianiline. The methylenedianiline is used in amounts of 9.0, 10.8, 12.1, and 12.7 parts which correspond to 70, 85, 90, and 100% respectively of the isocyanate groups in the prepolymer. The elastomers prepared from 100% of methylenedianiline does not fall within the scope of this invention and is included as a control. Dibutyltin dilaurate is used in all proportions in an amount of 0.1 part. The elastomers are cured for 6 hours at 100° C. and tested after 7 days at 25° C./50% relative humidity. Physical properties for these elastomers are tabulated below.

|  | Methylenedianiline, percent of NCO in prepolymer | | | |
|---|---|---|---|---|
|  | 70 | 85 | 90 | 100 |
| Tensile strength, p.s.i. | 5,550 | 6,150 | 6,800 | 5,100 |
| Elongation at break, percent | 400 | 420 | 440 | 450 |
| Modulus: | | | | |
| 100%, p.s.i. | 1,580 | 1,610 | 1,680 | 1,600 |
| 300%, p.s.i. | 3,700 | 3,380 | 3,600 | 3,200 |
| Compression set, B, percent (22 hrs. at 70° C.) | 35 | 29 | 36 | 46 |
| Bashore resilience, percent | 52 | 52 | 50 | 50 |
| Hardness, Durometer D | 53 | 52 | 52 | 53 |

The physical properties of these four elastomers are about the same except for compression set which is significantly poorer for the control polymer. This illustrates the importance of the water-curing step.

Example 4

A prepolymer is prepared by reacting 2260 parts of poly(70 ethylene/30 propylene adipate) glycol having a number average molecular weight of about 2260 with 524 parts of PICM containing 70% trans-trans isomer for about 2 hours at 120° C. An elastomer is prepared by mixing 100 parts of this prepolymer with 5.71 parts of 4,4'-methylenedianiline in the presence of 0.1 part of dibutyltin dilaurate for about one minute at 100° C. This amount of methylenedianiline corresponds to 95% of the NCO groups in the prepolymer. The mixture is poured into molds and cured for 10 hours at 100° C. After standing for 7 days at 25° C./50% relative humidity the elastomer has the following properties.

| | |
|---|---|
| Tensile strength, p.s.i. | 7450 |
| Elongation at break, percent | 730 |
| Modulus, 100%, p.s.i. | 550 |
| Modulus, 300% p.s.i. | 1200 |
| Tear, D-470, p.l.i. | 105 |
| Compression set, B, percent (22 hrs./70° C.) | 35 |
| Bashore Resilience, percent | 46 |
| Hardness, Durometer A | 80 |

If the elastomer is held for 7 days in the absence of water or if the dibutyltin dilaurate catalyst is omitted, the compression set increases from 35% to about 45%.

Example 5

A prepolymer is prepared by reacting 2160 parts of polypropylene ether glycol (number average molecular weight about 2160) with 576 parts of PICM containing 70% trans-trans isomer in the presence of 0.08 part of dibutyltin dilaurate for 3 hours at 125° C. The prepolymer has an —NCO content of 3.68%.

An elastomer is prepared by mixing 100 parts of the above prepolymer with 8.24 parts of methylene dianiline (equivalent to 95% of the NCO groups in the prepolymer) at 100° C. for about one minute and pouring the resulting mixture into molds. The mixture is cured for 10 hours at 100° C. and tested after 7 days at 25° C. and 50% relative humidity. The catalyst required to complete the water cure under these mild conditions is provided by the catalyst present from the preparation of the prepolymer. The resulting elastomer has the following properties.

| | |
|---|---|
| Tensile strength, p.s.i. | 2100 |
| Elongation at break, percent | 750 |
| Modulus, 100%, p.s.i. | 650 |
| Modulus, 300%, p.s.i. | 1050 |
| Tear, D-470, p.l.i. | 87 |
| Compression set, B, percent (22 hrs. at 70° C.) | 35 |
| Bashore resilience, percent | 52 |
| Hardness, Durometer A | 80 |

I claim:

1. A polyurethane/polyurea elastomer prepared by the process consisting essentially of reacting a 4,4'-methylenebis (cyclohexyl isocyanate) containing at least about 60% of a trans-trans isomer of 4,4'-methylenebis (cyclohexyl isocyanate) with a polyol, and an aromatic polyamine free of negative constituents in any order to prepare a polyurethane/polyurea elastomer which is then cured by contacting said elastomer with water, said diisocyanate, polyol, polyamine and water being used in proportions such that (a) there are about 1.4 through 4.0 equivalents of diisocyanate per equivalent of polyol, (b) polyamine is provided in an amount of about 65 to 98% of the excess isocyanate equivalents over the polyol equivalents and (c) sufficient water is provided to react with the excess equivalents of isocyanato groups over the equivalents of polyol plus polyamine.

2. The elastomer of claim 1 wherein the water-cure is carried out by contacting the diisocyanate-polyol-polyamine reaction product with water vapor in an atmosphere having a relative humidity of at least about 30%.

3. The elastomer of claim 1 wherein a catalyst for the water-isocyanate reaction is present during the water-cure step.

4. The elastomer of claim 1 wherein the diisocyanate and polyol are first reacted to prepare an isocyanato-terminated prepolymer and the prepolymer is then reacted with the aromatic polyamine and the elastomer is then subsequently contacted with water.

5. The elastomer of claim 4 wherein the prepolymer is first reacted with the polyamine and the resulting amine-cured product is water-cured by reaction with the water in an atmosphere having a relative humidity of at least about 30%.

6. The elastomer of claim 5 wherein a catalyst for the water-isocyanate reaction is present during the water cure.

7. The elastomer of claim 4 wherein sufficient aromatic polyamine is added to react with about 80–95% of the isocyanato groups of the prepolymer.

8. The elastomer of claim 4 wherein the 4,4'-methylenebis(cyclohexyl isocyanate) contains about 70–85% trans-trans isomer and the polyol is a polyalkyleneether polyol having a molecular weight of about 600–2000.

9. The elastomer of claim 4 wherein the polyol is a polyester glycol.

10. The elastomer of claim 8 wherein the water cure is carried out by reacting the amine-cured prepolymer with the water vapor in an atmosphere having a relative humidity of at least about 30%.

11. The elastomer of claim 10 in which there is a catalyst present during the water cure.

12. The elastomer of claim 10 wherein the polyamine is 4,4'-methylenedianiline or tolylene diamine.

13. The elastomer of claim 10 wherein the polyol is polytetramethyleneether glycol.

References Cited

UNITED STATES PATENTS

| | | | |
|---|---|---|---|
| 2,741,800 | 4/1956 | Brockway | 18—58 |
| 2,929,800 | 3/1960 | Hill | 260—77.5 |
| 3,456,037 | 7/1969 | Hoeschele | 260—858 |
| 3,436,361 | 4/1969 | Wooster | 260—18 |
| 3,554,962 | 1/1971 | Fischer | 260—45.8 |
| 3,620,905 | 11/1971 | Abramjian | 161—190 |
| 3,586,649 | 6/1971 | Cobbledick | 260—2.5 |
| 3,099,516 | 7/1963 | Henrickson | 18—48 |
| 3,523,464 | 8/1970 | Quillery et al. | 74—552 |
| 3,563,906 | 2/1971 | Hoeschele | 252—182 |
| 3,575,894 | 4/1971 | Zorn et al. | 260—2.5 |
| 3,595,732 | 7/1971 | Tingerthal | 161—159 |

FOREIGN PATENTS

| | | |
|---|---|---|
| 1,135,890 | 12/1968 | Great Britain. |

OTHER REFERENCES

Application of Irwin, S.N. 64,900, filed July 30, 1960.

DONALD E. CZAJA, Primary Examiner

H. S. COCKERAM, Assistant Examiner

U.S. Cl. X.R.

260—75 NH, 75 NE, 75 NA, 77.5 A, 77.5 AT, 77.5 AA, 77.5 AM